US007619999B2

(12) United States Patent
DaCosta

(10) Patent No.: US 7,619,999 B2
(45) Date of Patent: Nov. 17, 2009

(54) PROXIMITY BASED WIRELESS NETWORK

(75) Inventor: Behram DaCosta, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 536 days.

(21) Appl. No.: 11/242,105

(22) Filed: Oct. 3, 2005

(65) Prior Publication Data

US 2007/0087682 A1   Apr. 19, 2007

(51) Int. Cl.
*H04H 20/71* (2008.01)
*H04W 4/00* (2009.01)
*H04B 7/00* (2006.01)

(52) U.S. Cl. .................. 370/312; 370/338; 455/41.2

(58) Field of Classification Search .................. 370/312, 370/338; 455/41.2
See application file for complete search history.

(56) References Cited

U.S. PATENT DOCUMENTS

| 6,714,535 | B1 | | 3/2004 | Herh |
| 7,336,928 | B2 | * | 2/2008 | Paalasmaa et al. ......... 455/41.2 |
| 2002/0077077 | A1 | | 6/2002 | Rezvani et al. |
| 2004/0103312 | A1 | * | 5/2004 | Messerges et al. .......... 713/201 |
| 2004/0162022 | A1 | * | 8/2004 | Lahetkangas et al. ...... 455/41.1 |
| 2004/0203746 | A1 | | 10/2004 | Knauerhase et al. |
| 2004/0249846 | A1 | * | 12/2004 | Randall et al. .............. 707/102 |
| 2005/0113113 | A1 | | 5/2005 | Reed |
| 2005/0130634 | A1 | | 6/2005 | Godfrey |
| 2005/0135305 | A1 | | 6/2005 | Wentink |
| 2005/0138119 | A1 | * | 6/2005 | Saridakis .................... 709/204 |
| 2005/0165795 | A1 | * | 7/2005 | Myka et al. ................. 707/100 |
| 2005/0184875 | A1 | | 8/2005 | Schmandt et al. |
| 2005/0210514 | A1 | | 9/2005 | Kittlaus et al. |

(Continued)

FOREIGN PATENT DOCUMENTS

WO   WO 2004/004276 A1   1/2004

(Continued)

OTHER PUBLICATIONS

International Search Report and Written Opinion, PCT/US06/37083, Apr. 24, 2007.

*Primary Examiner*—Barry W Taylor
(74) *Attorney, Agent, or Firm*—Miller Patent Services; Jerry A. Miller

(57) ABSTRACT

A wireless communication method consistent with certain embodiments involves, at a first portable wireless device (PWD), receiving a beacon indicating that the first PWD has entered a wireless network's communication range; the first PWD responding to the beacon with a request for authorization on wireless network; receiving authorization for the first PWD to communicate using the wireless network; sending a request for the first PWD to be associated with the wireless network; the first PWD receiving confirmation of association with the wireless network; the first PWD broadcasting a first announcement over the wireless network, the announcement comprising at least an identifier that notifies other PWDs associated with the wireless network of the identity of the first PWD; receiving at least one reply announcement broadcast from a second PWD associated with the wireless network that identifies the second PWD; and at the first PWD providing a first shared public folder with contents that can be accessed by the second PWD. This abstract is not to be considered limiting, since other embodiments may deviate from the features described in this abstract.

29 Claims, 12 Drawing Sheets

U.S. PATENT DOCUMENTS

2005/0250552 A1* 11/2005 Eagle et al. .................. 455/567
2006/0041943 A1* 2/2006 Singer et al. .................. 726/27
2006/0045055 A1* 3/2006 Ramadas et al. ............ 370/338

FOREIGN PATENT DOCUMENTS

WO    WO 2004/051916 A1   6/2004
WO    WO 2004/052034 A1   6/2004

* cited by examiner

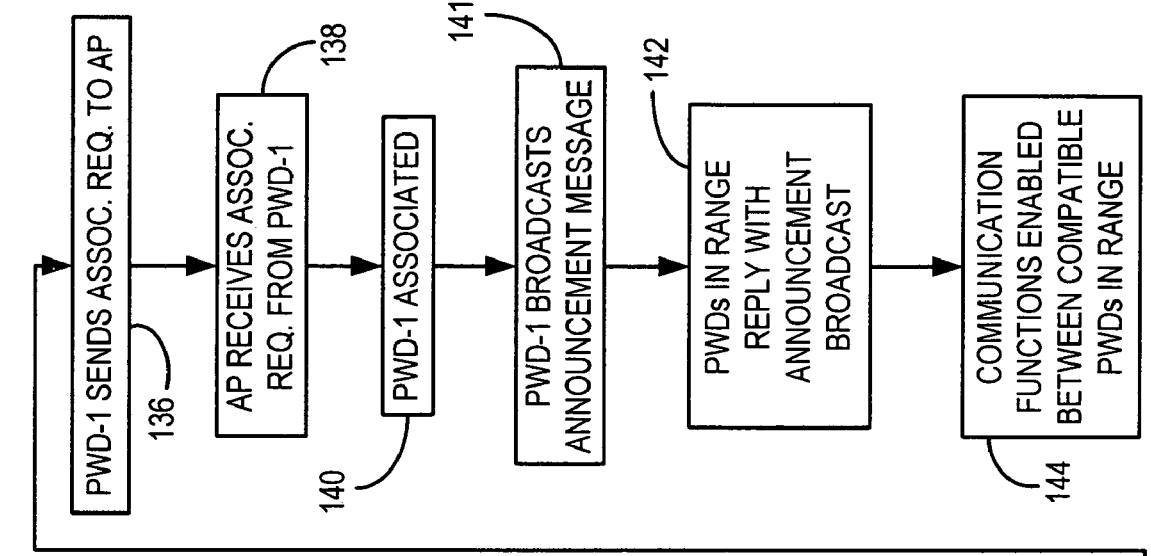
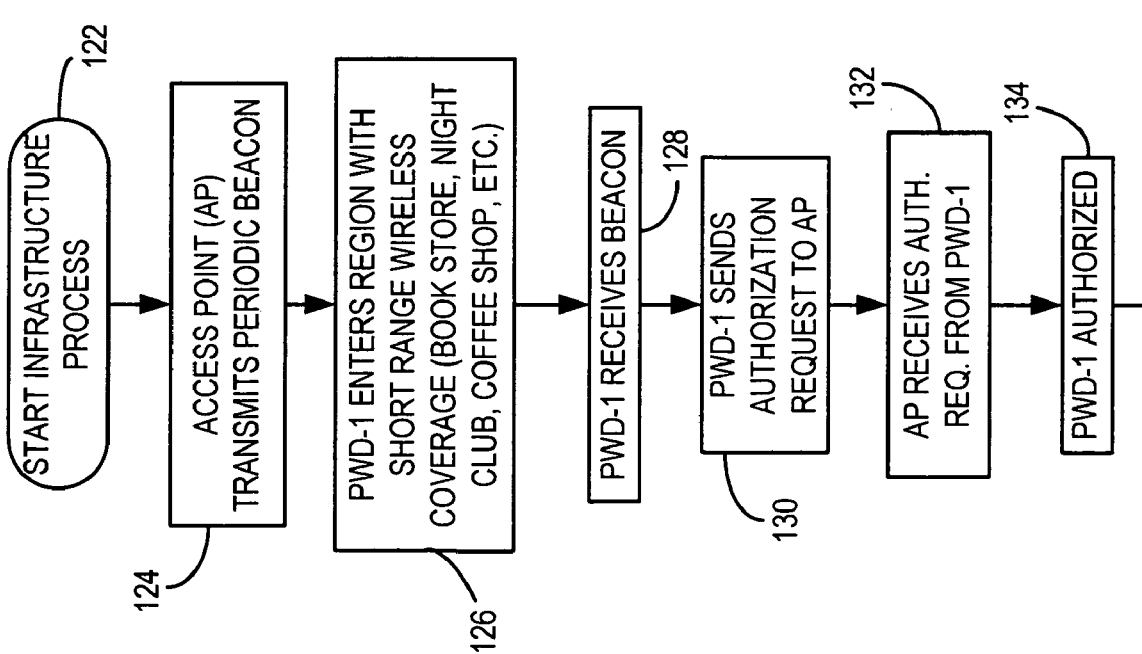
FIG. 9

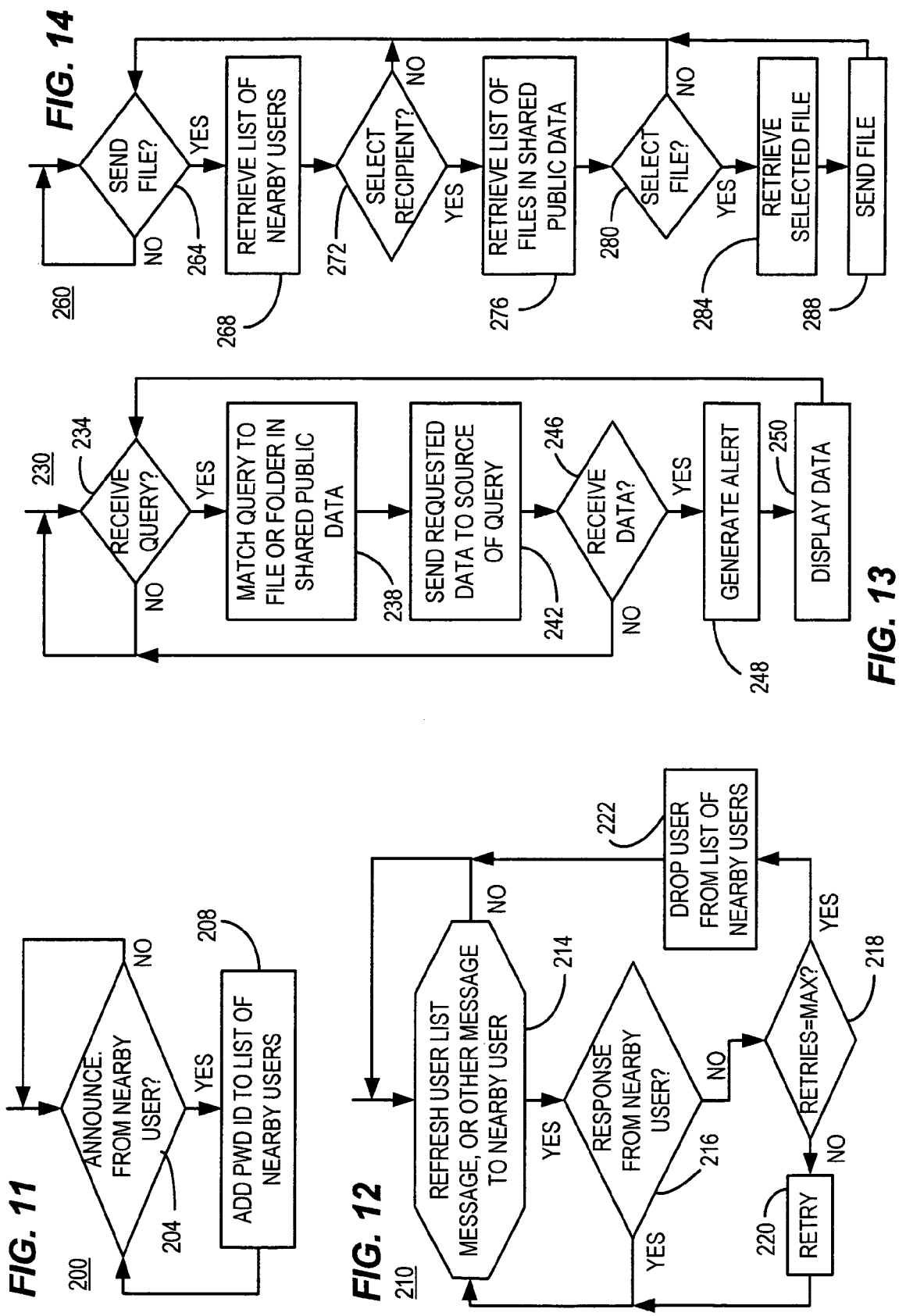

PROXIMITY BASED WIRELESS NETWORK

BACKGROUND

The proliferation of computers, wireless telephones, pagers, and other gadgets has resulted in many people being considered "on call" at all times. While these devices have proven to be useful and powerful business tools, they can also inhibit social interaction by making their owners on call so much of the time.

While cellular telephones and other messaging devices are commonly used for pleasure as well as business, they are generally available only to an established network of acquaintances and have heretofore not been very useful as a tool for making new acquaintances.

The Internet and its associated applications such as chat rooms and e-mail have been somewhat effectively utilized for gathering together those with like interests. However, in many instances those with like interests may be located long distances away. Additionally, Internet chat rooms and the like can be impersonal and dangerous since one can easily pose as someone else or disguise one's true intentions.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 9 is a flow chart depicting an infrastructure association and announcement process consistent with certain embodiments of the present invention.

FIG. 11 is a flow chart depicting building of a list of nearby users in a manner consistent with certain embodiments of the present invention.

FIG. 12 is a flow chart depicting dropping a user from a list of nearby users in a manner consistent with certain embodiments of the present invention.

FIG. 13 is a flow chart depicting a data query process consistent with certain embodiments of the present invention.

FIG. 14 is a flow chart depicting a file transmission process consistent with certain embodiments of the present invention.

DETAILED DESCRIPTION

Figure 1:
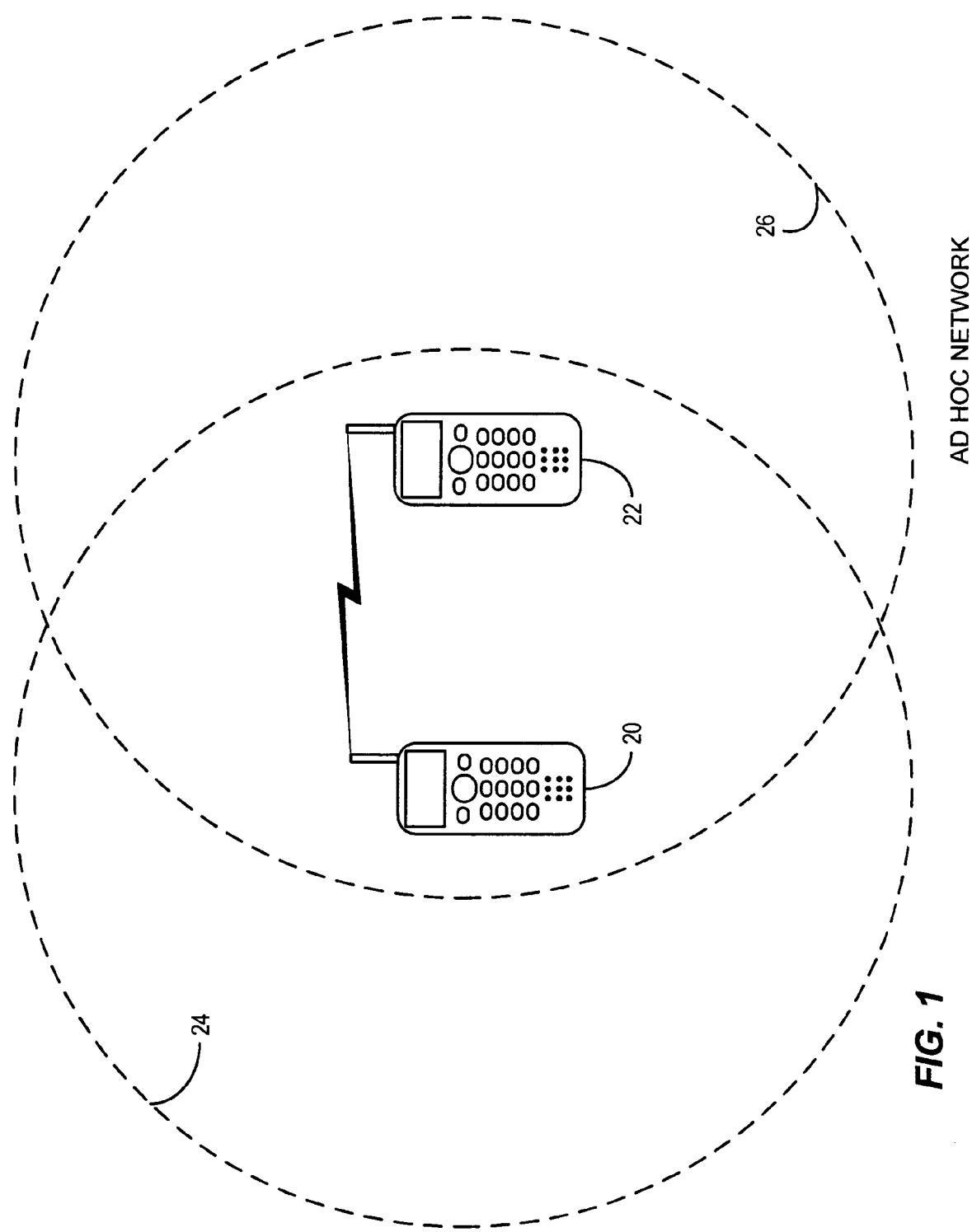
FIG. 1 is an exemplary ad hoc wireless network consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as meaning any one or any combination. Therefore, "A, B or C" means "any of the following: A; B; A and B; A and C; B and C; A, B and C". An exception to this definition will occur only when a combination of elements, functions, steps or acts are in some way inherently mutually exclusive.

In accordance with certain embodiments consistent with the present invention, portable wireless devices (PWD) such as telephones, personal digital assistants, and the like can be utilized to meet people and communicate with others having common interests. Moreover, while the techniques described herein can be made personal or kept impersonal, techniques consistent with embodiments of the present invention can be utilized to either make acquaintances, communicate with existing acquaintances, or simply share information with those nearby.

This invention relates to devices, methods, systems and other aspects referred to herein as CloudNet. CloudNet, according to certain embodiments, provides for sharing content and information amongst people in the same spatial vicinity (or the same virtual spatial vicinity), with support for digital rights management (DRM) if needed. In accordance with certain embodiments, this invention recognizes the fact that peer-peer networks are largely impersonal, and that people with mobile devices might seek to know more about the people (including, for example without limitation, music/ video likes of other people) who are similar to them by virtue of them being at the same location, whether being present at a book-signing event, concert, on an airplane flight. By virtue of the people being at a similar location, the people may have similar interests and therefore an interest in the content (e.g., books, music, video, pictures, writings, personal information, etc.) of others in the group. This may also allow people to initially get to know others in the group in a less intrusive manner.

Present peer-peer networks do not differentiate between content in the next room and someone across the world. By virtue of the people being at a similar location, the people may have a higher probability of having an interest in the content (e.g., books, music, video, or personal information, etc.) with others in the group. Present peer-peer networks also typically require a certain amount of centralized coordination to increase efficiency over the entire Internet.

CloudNet may be most applicable to implementation on portable wireless devices (PWD) such as portable game stations, cellular or other wireless telephones phones, personal digital assistants (PDA) and the like. The system can be implemented using existing wireless networking technology such as IEEE 802.11x or other wireless communication support. While several exemplary embodiments of the invention is described, numerous variations are possible and will become apparent to those skilled in the art upon consideration of the present teachings.

In accordance with the present example implementations, the PWD has support for at least one non-LOS (line of sight) wireless local area network (WLAN) e.g. 802.11x, UWB (ultra-wideband), etc. In one embodiment, the mobile devices would operate as nodes in an ad-hoc network; however, an infrastructure network may also be used as will be described. The PWD is capable of establishing wireless connections directly with other PWD devices (or stationary wireless devices) in its wireless range, and may also support indirect connections with other wireless devices using mesh-networking.

With reference to FIG. 1, it is noted that it is common for people having the same interests to appear in the same physical locations. For example, those with common interests in a particular type of music are likely to be present at a particular concert, and those interested in movies or the theater are likely to appear at movie theaters and performance theaters. By recognition and use of this physical proximity, together with user controllable shared information, technology that was often considered intrusive heretofore can be utilized to widened one's circle or acquaintances and meet or communicated with those with common interests. In accordance with FIG. 1, two portable wireless devices 20 and 22 are shown to be in physical proximity to one another such that the communication range for each device (indicated respectively by dashed circles 24 and 26) overlap so that device 20 and device 22 can be considered to be within range of one another. In this example, if appropriate protocols were followed for computer networking, portable wireless device 20 and portable wireless device 22 could communicate utilizing an ad hoc network structure similar to those used by existing wireless computing devices.

As will become clear later, once two devices are within range of one another, by utilization of the techniques described herein, information can be automatically shared or automatically made available for sharing between the two devices when they come into range of each other.

Figure 2:
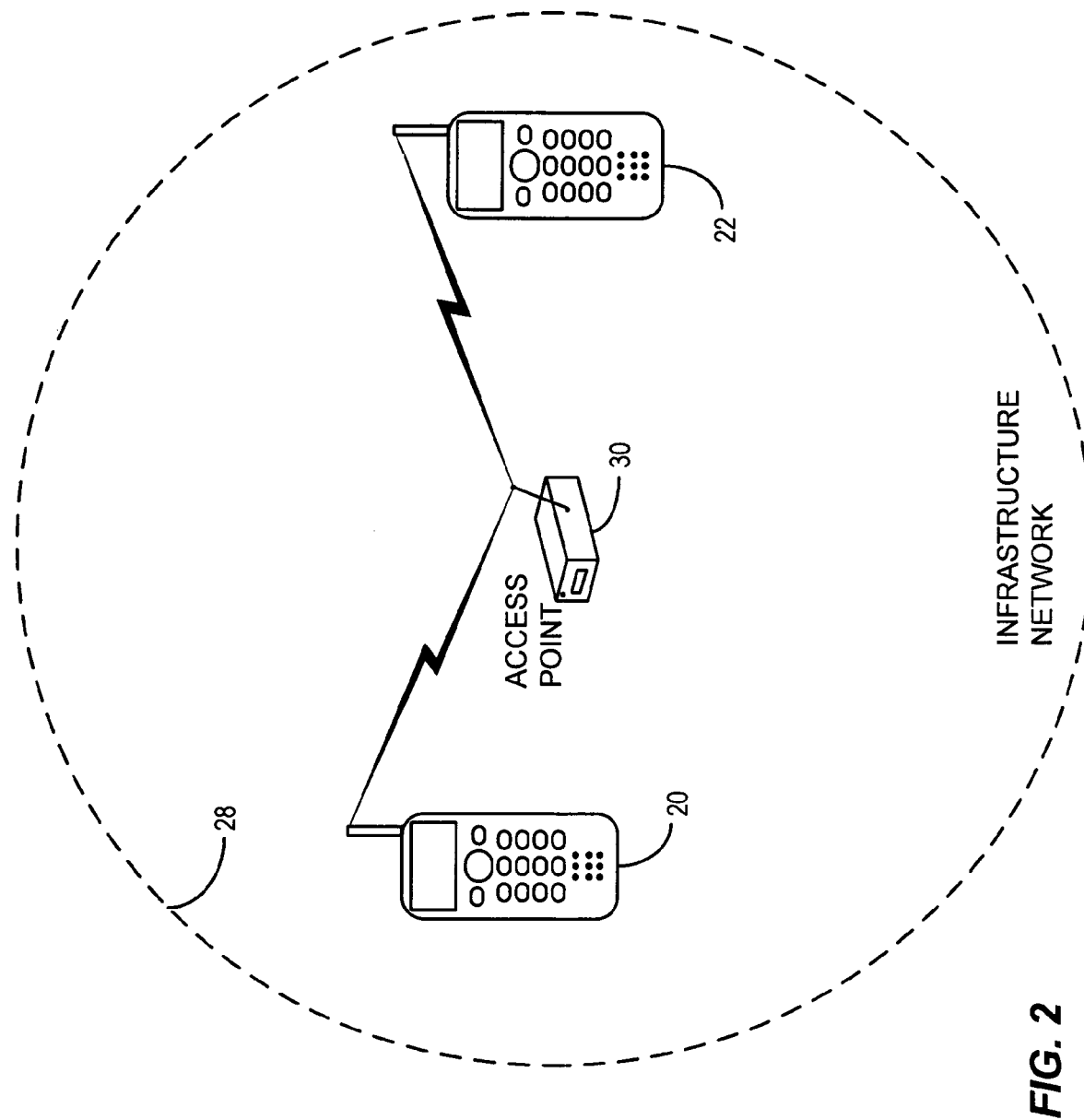
FIG. 2 is an exemplary infrastructure network consistent with certain embodiments of the present invention.

Before proceeding to further details, it is also useful to consider the type of network structure generally referred to an infrastructure network as depicted in FIG. 2. In such a network, two devices such as PWD 20 and 22 could achieve network communication functions between themselves if they enter a range 28 of a network access point 30. In such a network environment, communication may be either directly between devices 20 and 22 under the supervision of the access point, or may pass through the access point 30 as depicted in FIG. 2. Either type of network (or both) can be used in a manner consistent with embodiments of the present invention.

Figure 3:
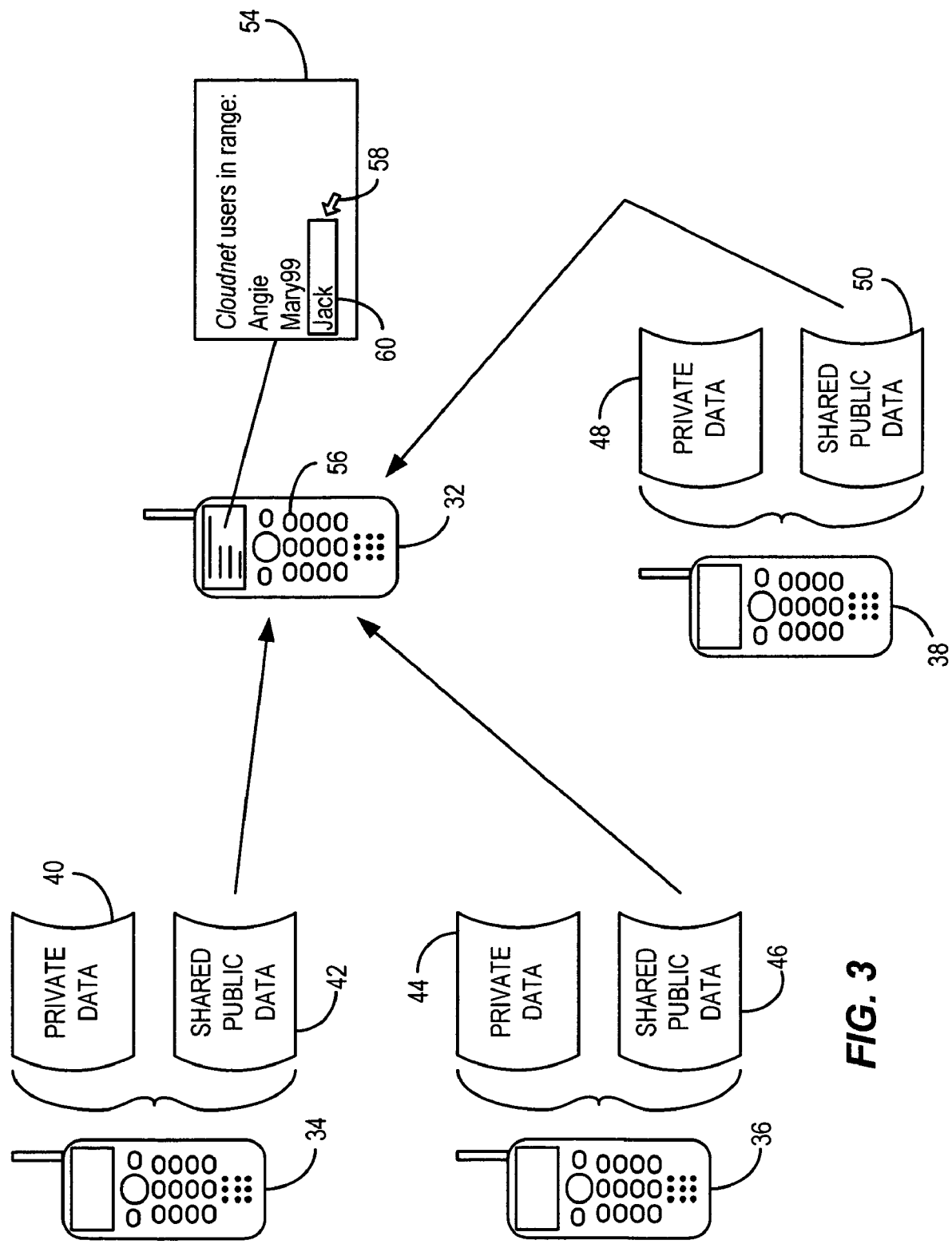
FIG. 3 illustrates the shared public directory used in a manner consistent with certain embodiments of the present invention.
Figure 4:
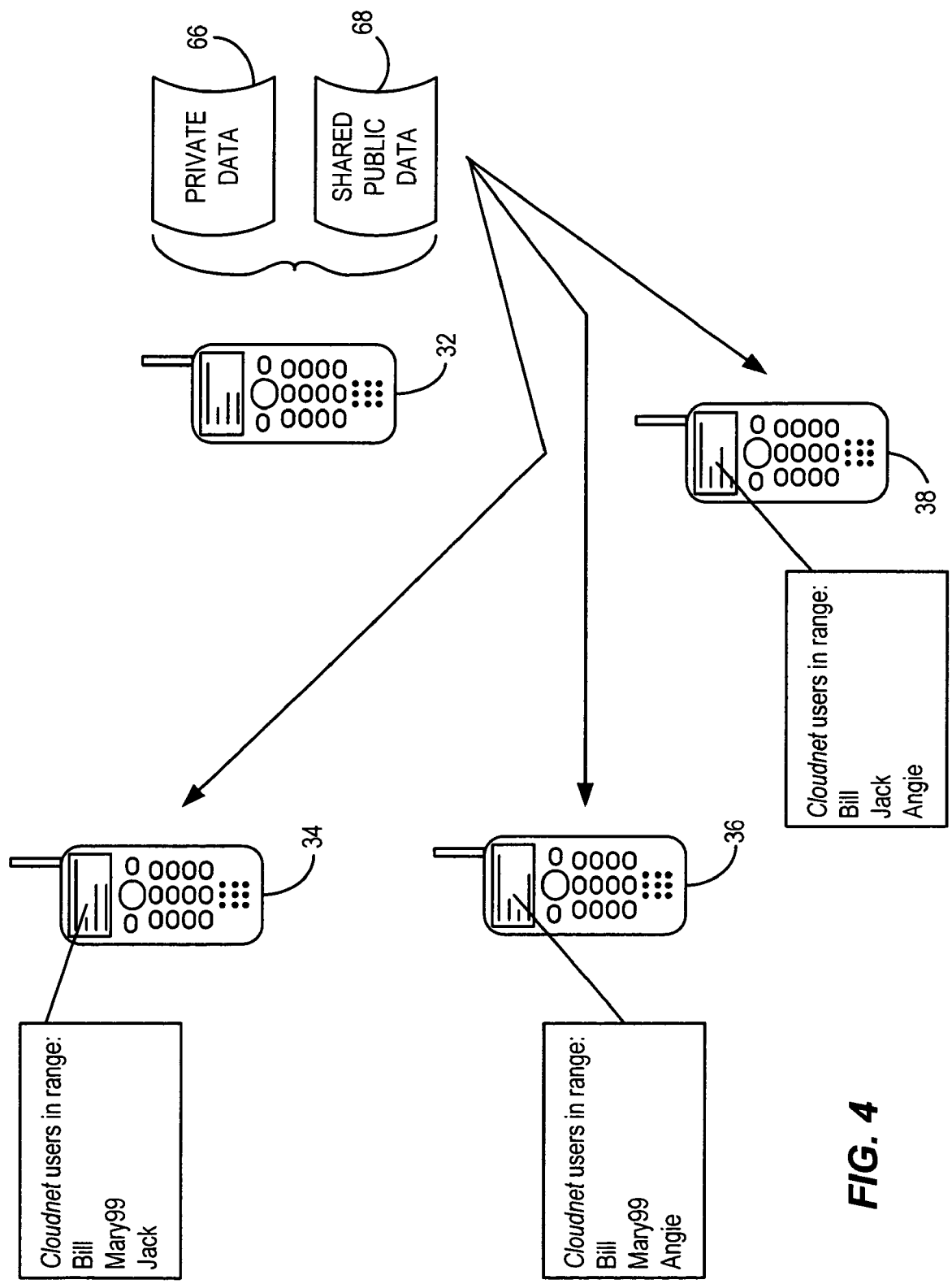
FIG. 4 also illustrates the shared public directory used in a manner consistent with certain embodiments of the present invention.

Referring now to FIGS. 3 AND 4, one embodiment of the data sharing mechanism consistent with embodiments of the present invention is depicted. In this embodiment, four portable wireless devices (PWB) 32, 34, 36, and 38 are depicted and are assumed to already be within communication range of each other by virtue of either an ad hoc or infrastructure network arrangement. For purposes of this illustration, assume that PWD 32 enters the network last. In accordance with one embodiment, upon entering the communication range of the wireless network, the network communication protocol is devised such that the newly entering portable device 32 is apprised of the identity of each of the other portable wireless devices within the network.

Each of the portable wireless devices in the network includes data storage memory devices (e.g., solid state or disc based) that can be used to store private data as well as shared public data. Thus, PWD 34 has private data 40 and shared public data 42 while PWD 36 has private data 44 and shared public data 46. Similarly, PWD 38 has private data 48 and shared public data 50. Upon entering the network, PWD 32 is advised of the presence of three other portable wireless devices 34, 36, and 38 by virtue of a user name, alias, "handle" or other identifier. In one embodiment, this mechanism is provided using an application referred to herein as CloudNet. In this embodiment, upon entry into the range of the wireless network, a display 54 of PWD 32 displays a listing of all users of the CloudNet application within range. The user of PWD 32 can then utilize the user interface 56 of PWD 32 to select a user by use of a movable cursor 58 or other pointing mechanisms such as a reverse video or highlighting function as depicted at 60 by a box surrounding the selection. In accordance with the present embodiment, the user of PWD 32 (Bill in this case) can select one of the other three users appearing on his display 54 and obtain access to the shared public data of any of the CloudNet users in range (i.e. shared public data 42, 46, and 50).

Referring now to FIG. 4, in a like manner, portable wireless device 32 has storage for private data 66, as well as shared public data 68 which may be accessed by any of the users of PWD 34, 36, or 38. As depicted in FIG. 4, each of the PWD displays for PWD 34, 36, and 38 now display each of the other three users including Bill, the user of PWD 32. In a like manner, any of the users of PWD 34, 36, or 38 can access the shared public data 68 of PWD 32 by first selecting Bill from their display and user interface.

While the above embodiment depicts an identifier being utilized as the only information initially displayed from the users within range of the various portable wireless devices, other embodiments are also possible as will be depicted later.

Figure 5:
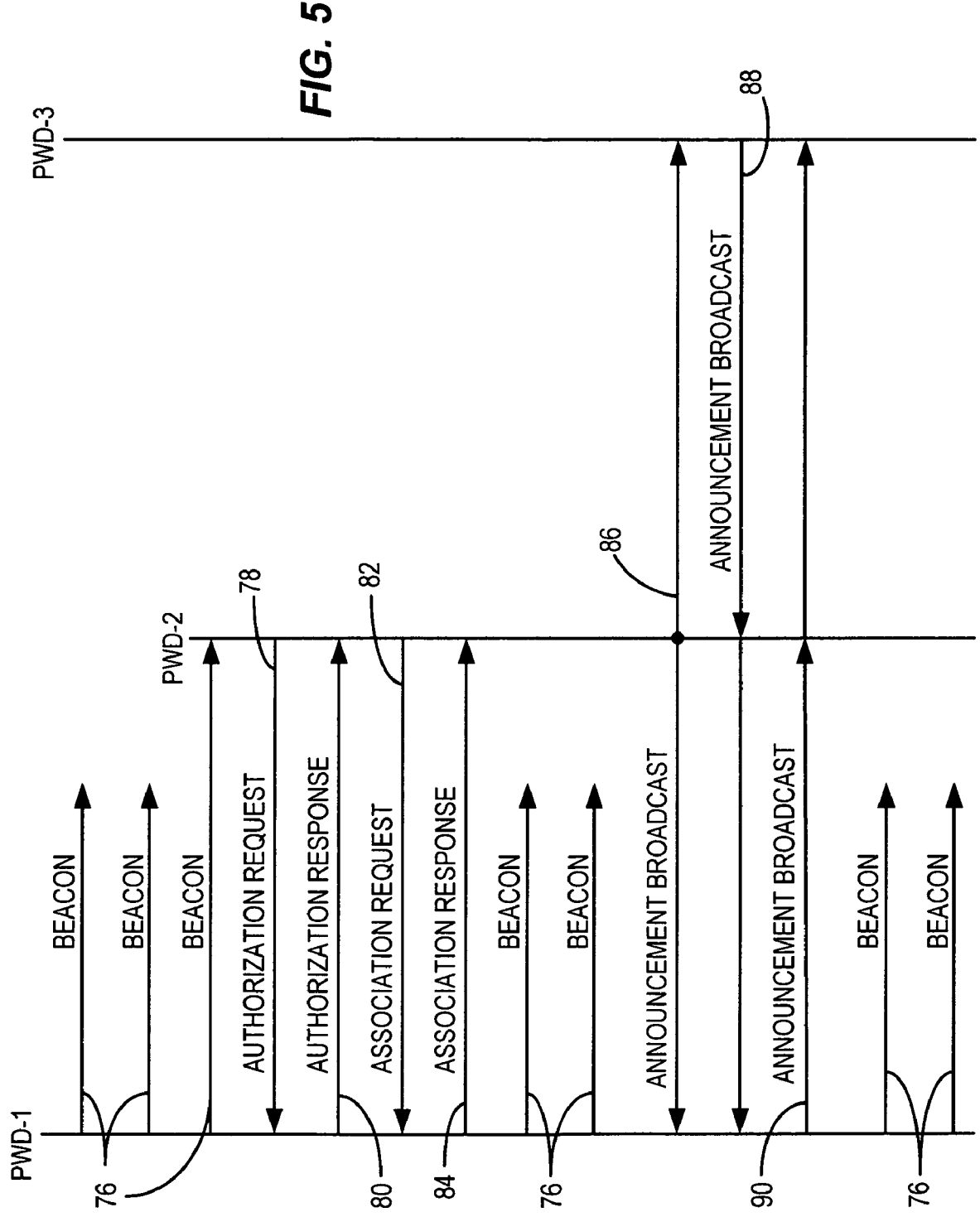
FIG. 5 is a message flow diagram of an association and announcement process consistent with certain embodiments of the present invention.

In order to understand something of the high level protocol utilized in connection with certain embodiments consistent with the present invention, the signal flow diagram of FIG. 5 is instructive. In this diagram, it is presumed that an ad hoc network is being utilized in which a first portable wireless device, PWD-1, is acting as a coordinator station (CS). For purposes of this example, it is also presumed that PWD-3 is already in communication with PWD-1 and PWD-2 has just entered the wireless communication range shared by PWD-1 and PWD-3. In accordance with this example, PWD-1 acts as the coordinating station and thus transmits a periodic beacon signal 76 which alerts portable wireless devices entering the wireless communication range of PWD-1 that an ad hoc network is present.

The Beacon signal is depicted with shorter arrows in this figure in order to depict a general broadcast which is not currently the subject of a response. The shorter arrows are utilized to minimize clutter in FIG. 5.

In an infrastructure network for 802.11x for example (such as that shown in FIG. 2), one device is configured to be the Access Point. Often, the Access Point is also connected to the Internet or main network infrastructure, hence its name. All other devices (called "Stations" in 802.11x technology) initially associate themselves with the Access Point. The Access Point transmits the Beacon periodically (e.g. every 200 milliseconds). The Beacon provides information such as what data rates (via different RF modulations and forward error correction codes, for example) the Access Point supports, the name of the Access Point, etc. Hence devices that enter the range in which they can receive the Beacon (for example, approximately 120 feet indoors for certain technologies) would know a network exists, what name it has, and what performance is supports. Devices entering range and receiving the beacon signal can request entry into the network by sending the Access Point an "Association Request" message.

If the station is granted Association by the Access Point, the Station may then use a higher level application to detect which devices are on the network, and what content/features/services these devices provide. This higher level application can be a custom application provided by the CloudNet protocol, or it could use standardized messages provided by "UpnP" (universal plug and play) initiative wherever appropriate UpnP messages do exist. Regardless of whether the method is specific to CloudNet, or whether CloudNet re-uses some other commands used for UpnP for example, the following is done: The new device sends a broadcast (i.e., transmitted to every device on network) announcement message announcing it's name, what information/directories it provides, what services it provides, etc. In response the other devices rebroadcast their own similar information. Further CloudNet messages are then used to access contents in the user's directories by sending a message from the requesting device to the destination device for more information on specific directories or files, etc.

In an infrastructure messages between two stations generally through the Access Point, i.e., the Access Point is the central forwarder of all messages. However, recently for 802.11, an enhancement has been added to allow two stations in an infrastructure network to directly transmit to each other without going through the access point. This improves transmission efficiency for the network in some cases. However, according to one such enhancement, the stations must still first get permission from the access point to do so. For ad hoc networks such as that depicted in FIG. 1, a network is setup whenever two or more "stations" i.e. client/mobile devices detect each other. One of these devices will assume the role of coordinator, and will broadcast Beacons. There is no Access Point. Stations directly transmit to each other.

The issue of ad hoc vs. infrastructure is not relevant to embodiments consistent with the present invention, except for implementation details. Either type of network can be utilized.

Regarding the format of the Beacon messages, there are at least two methods to handle this. In the first case, the Beacon messages are modified to include, for example, a specific name or other identifier that other devices will recognize as belonging to a CloudNet network. An encryption key can be used that is common knowledge to all CloudNet devices that will allow them to associate and communicate with this network, but will prevent other non-CloudNet devices from trying to access this network. In another embodiment, all devices (including non-CloudNet devices) are allowed to access the network, but to use the higher level messages mentioned above (UpNP and CloudNet specific messages) to find out which of the devices on the network actually support the CloudNet protocol/application and which provide content for sharing etc.

Returning to the signal flow diagram of FIG. 5, when PWD-2 receives the Beacon signal from PWD-1, PWD-2 replies with an authorization request signal 78. This authorization request 78 is a message that essentially asks for permission to join the network. If PWD-1 approves of PWD-2 joining the network, an authorization response 80 is transmitted by PWD-1 indicating that PWD-2 is authorized. If PWD-1 has enabled an encryption key for transmissions on the network, then PWD-2 must already possess the same encryption key in order to communicate. At other times, or in other embodiments of the network open authentication may be utilized and all the devices will be allowed to join the network by default. Once authenticated, PWD-2 formally joins the network. This is accomplished by an association request message transmitted at 82 from PWD-2 to PWD-1 and is acknowledged and approved by an association response 84 transmitted back from PWD-1 to PWD-2. Among all the transmissions relating to authorization association and otherwise, PWD-1 continues to periodically transmit Beacon signal 76 to alert other users that might enter the network that an ad hoc network is available for use.

Once PWD-2 is associated with the network, PWD-2 generates an announcement broadcast message 86. This announcement broadcast message can take on many forms in accordance with many variations consistent with the present invention. In one embodiment, the announcement message (which is generated by an upper level application such as the CloudNet application discussed herein) may only announce an identifier such as a user name, nickname, handle, or any other identifier that can be used to identify the portable wireless device and user thereof. This announcement broadcast 86 is received by PWD-1 and PWD-3 (which recall, is already associated with the network). This announcement is also presumably received by other PWDs that might be associated with the network. In response to the announcement broadcast, each of the associated PWDs respond with an announcement broadcast as depicted by 88 and 90 from PWD-3 and PWD-1 respectively. Once each of the portable wireless devices within the network have broadcast their announcement broadcast, each of the other probable wireless devices in the network is advised of at least an identifier for all devices within range that are compatible with the CloudNet application.

Before proceeding, one should consider the implications of the teachings thus far. If a set of users of the portable wireless devices are present within a relatively close geographic relationship (depending on the location, i.e. inside a building or within a city or in an open area) in order to permit receipt of a Beacon broadcast, there is a reasonable likelihood that the users are there for a particular reason associated with a common interest. For example, users gathered at a rock concert (or other genre) are likely to be interested in rock music in general or the particular performer or sub-genre in particular. Similarly, those gathered for a sporting event or are at a sports bar may be fans of a particular sporting team or at least a fan of the sport itself. When two or more such people congregate within communication range of the portable wireless devices, they are electronically placed in touch with each other. In accordance with the embodiment depicted thus far, the users are provided with at least a list of names or other identifiers of users with common interest. In other embodiments, a more complete description of the user may be provided by default by way of direct display of files, folders, messages, photographs, or other information that can be useful in determining whether or not a particular user might be interested in meeting another user. Many variations will occur to those skilled in the art upon consideration of the present teachings.

In one exemplary embodiment, the announcement broadcast 86, 88, and 90 contains substantially more information than simply an identifier. For example, the announcement broadcast may incorporate a list of the files and/or folders in the shared public folder for each PWD as well as potentially a photograph that is displayed by default. This embodiment is depicted in one example in FIG. 6.

Figure 6:
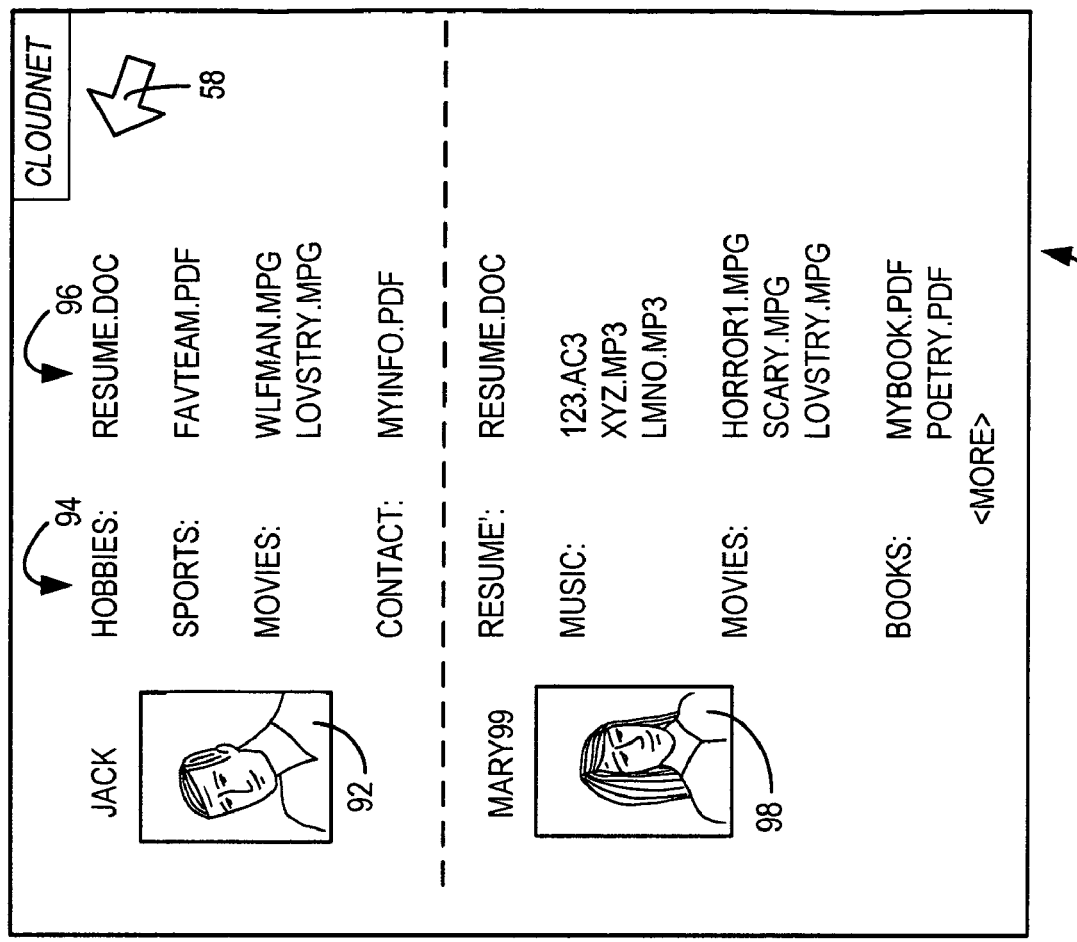
FIG. 6 is a screen illustration consistent with certain embodiments of the present invention.

Referring now to FIG. 6, one example display of a PWD is depicted. In this example, each user is "announced" by the announcement message transmitting a list of folders and files within the shared public folder, as well as a predefined photograph along with the name of the user. For example, in this depiction, screen 90 shows two of perhaps many devices within range. The amount of information displayed is only limited by the display capabilities of the PWD.

The contents of the shared public folder of the first device listed includes a photograph 92 of a user Jack, along with a list of folders 94 and the content of those folders in the form of a listing of documents or other files 96. If the user wishes to explore information further about Jack, a pointer such as 58 can be used to navigate to any of the available information in the shared public folder. Following the information about user Jack is information about a second user. This information is displayed under the handle Mary99. This user also incorporates a picture 98 as well as a list of folders and documents that can be shared and viewed by others. As shown in this example, more data may be available for Mary99 which can be accessed by using conventional scrolling techniques on a user interface to scroll the image down and obtain more information in order to effectively compensate for the smaller displays of a PWD. Similarly, additional PWD users in range may be listed further down that can be accessed by the user operating the user interface to scroll downward with the display.

In accordance with certain embodiments, the data provided in the shared public folder can be provided according to a fixed template with certain user variability. In other embodiments, the data provided by default or shared may be freeform data to a large extent that can be simply accessed as one would access folders and files on a conventional computer using navigation techniques. In order to provide for the safety and privacy of users, it is preferable that the user have a maximal amount of control over what information is displayed freely in this embodiment and what information must be explicitly transmitted by the user if desired. For example, one may not wish to be readily identified by photograph and name to others nearby who are unknown. Thus, a user may choose only to display a handle or other alias and perhaps some minimal amount of data that might be useful to achieve a desired result. For example, certain users may wish to post a resume on a shared public folder that can be accessed by others at a job fair. However, the user may wish to provide additional information and further identify him or her only upon request, so that the legitimacy of an inquiry or interest therein can be explored and interest in further contact can be evaluated.

In accordance with certain embodiments, all or certain of the public files can be accessed between users only upon request. In certain embodiments, the request must be explicitly granted by the user, while in others, the granting of such request is automatic. In still other embodiments, the granting of requests for the shared information can be tied to the file or folder itself by specifying either share always, share never, or share with approval.

Figure 7:
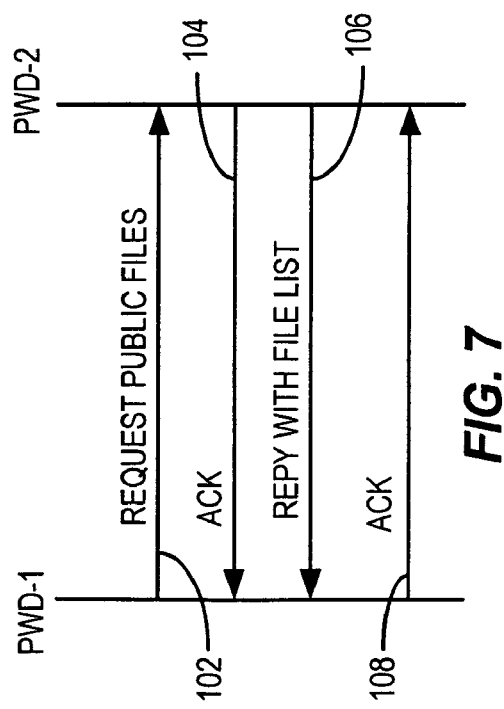
FIG. 7 is a message flow diagram of a file list request consistent with certain embodiments of the present invention.
Figure 8:
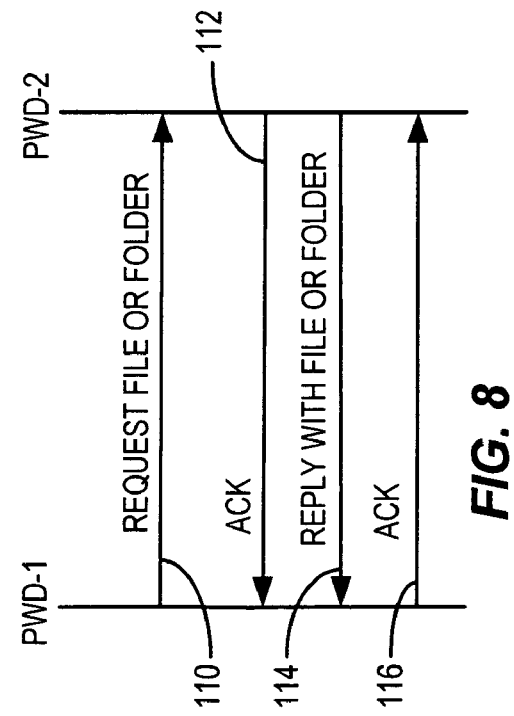
FIG. 8 is a message flow diagram of a file request consistent with certain embodiments of the present invention.

One example is shown in FIG. 7 in which public files are requested by PWD-1 of PWD-2. In this case, a message 102 requesting a list of public files is transmitted from PWD-1 to PWD-2. An acknowledgment 104 is transmitted back from PWD-2 to PWD-1. Depending upon the particular embodiment, a reply can be provided at 106 with a file list either automatically or only if after receiving a confirmation from the user of PWD-2 that it is acceptable to transmit the file list. Receipt of the file list can be acknowledged with an acknowledgment 108 from PWD-1 to PWD-2. In a similar manner, particular files can be requested from one user by another. In one embodiment, this is carried out as depicted in FIG. 8 starting a request for a particular file or folder transmitted as request 110 from PWD-1 to PWD-2. Receipt of the message is acknowledged at 112. At 114, the requested file or folder is transmitted as a reply (either with or without a requirement for prior consent by the user of PWD-2). Receipt of the file or folder is then acknowledged at 116. In a constantly changing network environment such as those common with portable wireless devices, acknowledgment messages such as those described above are useful in order to assure that complete messages have been properly received. However, other protocols can be devised with the scope of the present invention which do not require such acknowledgments.

Referring now to FIG. 9, a more detailed description of the process for associating a PWD with a network is described as process 120 for an infrastructure network starting at 122. At 124, an access point for the network transmits periodic beacon signals. When PWD-1 enters a region with a short-range wireless network coverage such as a book store, nightclub, concert, coffee shop, sporting event, theatrical production, etc., at 126 it receives a beacon signal 128 transmitted from the access point. PWD-1 then sends an authorization request to the access point at 130 and the access point receives the authorization request from PWD-1 at 132. This results in authorization of PWD-1 at 134 assuming that all authentication processes including possession of appropriate encryption keys where necessary is attended to. PWD-1 then sends an association request to the access point at 136. The access point receives the association request from PWD-1 at 138 and PWD-1 is associated at 140. PWD-1 then broadcasts an announcement message at 141 identifying itself to other PWDs in the network. The PWDs in range reply with announcement broadcasts of their own at 142, and once all the PWDs are aware of the presence of the others, communication functions are enabled between the compatible PWDs in range at 144. Thus, in accordance with process 120, each of the portable wireless devices within range of an infrastructure network are made aware of one another so that each PWD can build a list of associated devices within the network.

Figure 10:
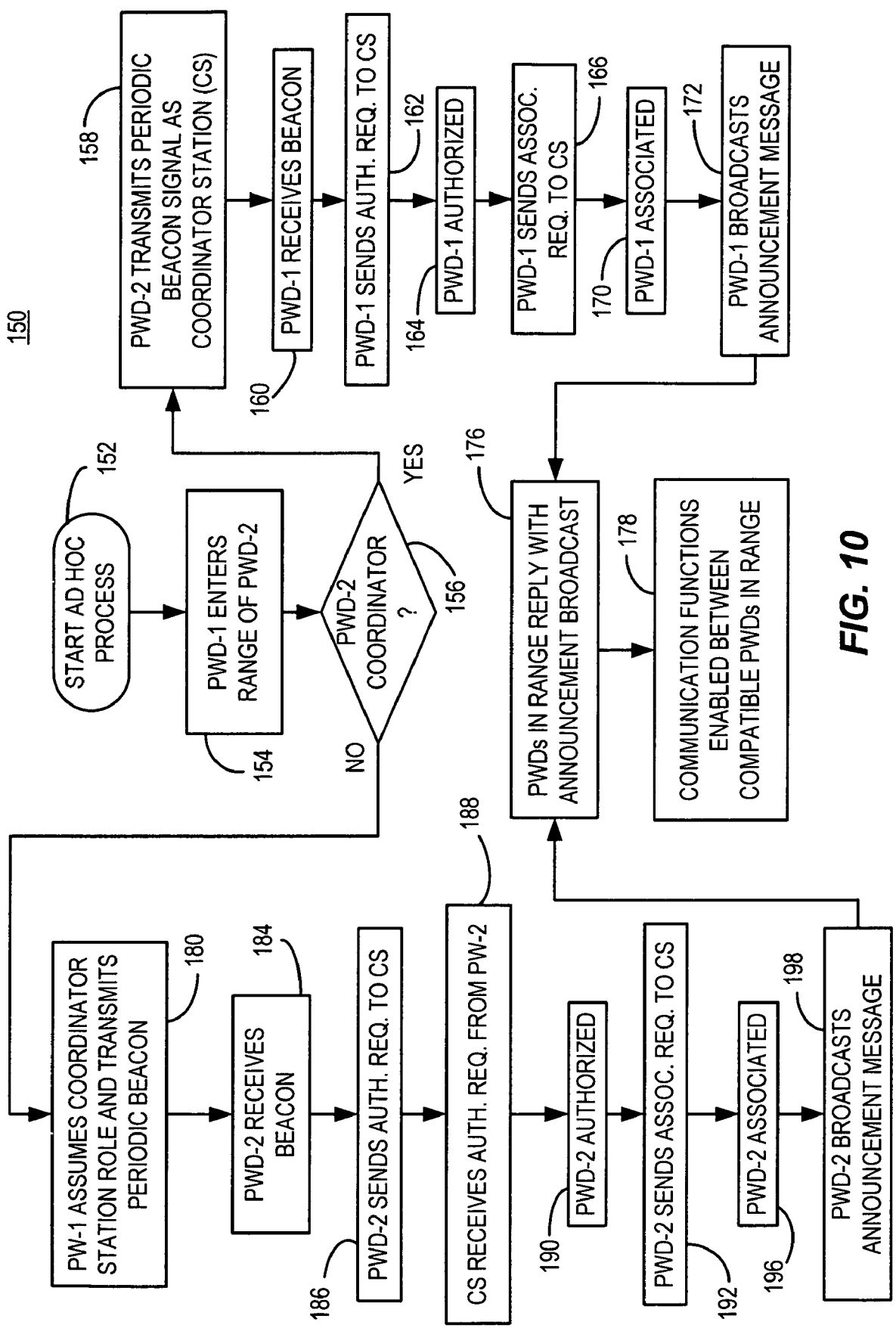
FIG. 10 is a flow chart depicting an ad hoc association and announcement process consistent with certain embodiments of the present invention.
Figure 15A:
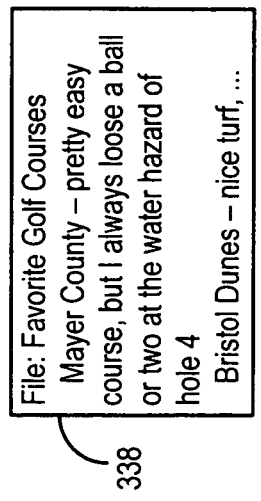
FIG. 15, which is made up of FIGS. 15*a*-15*i*, depicts a sequence of screen illustrations consistent with certain embodiments of the present invention.
Figure 15B:
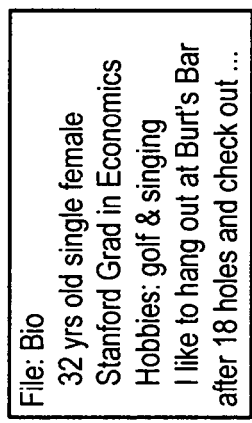
Figure 15C:
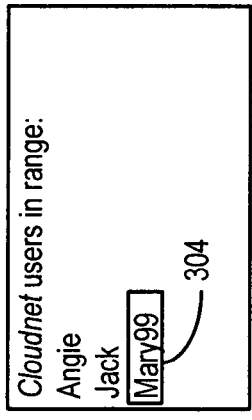
Figure 15D:
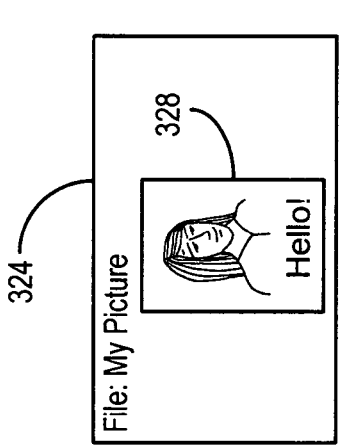
Figure 15E:
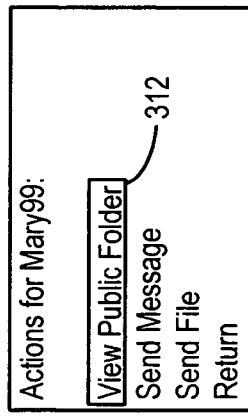
Figure 15F:
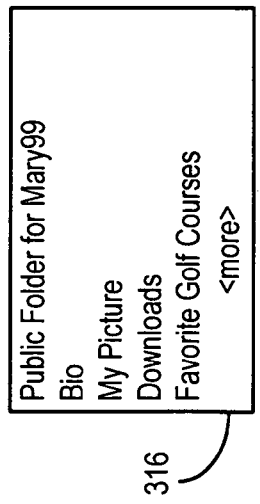
Figure 15G:
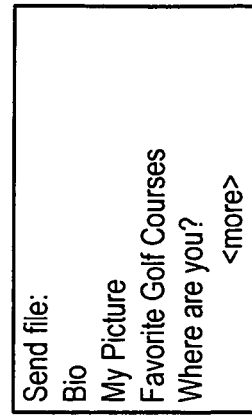
Figure 15H:
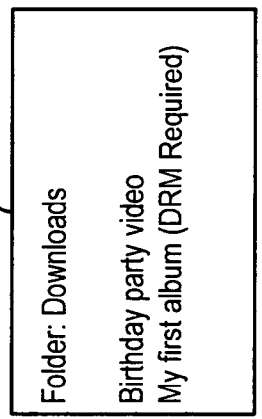
Figure 15I:

The operation of an ad hoc network is similar and is depicted as process 150 in FIG. 10. The major difference in the operation in an ad hoc environment versus an infrastructure environment is that one of the portable wireless devices operates as a coordinator station (CS) in place of the access point, with the CS determined on an ad hoc basis. The process starts at 152 after which PWD-1 and PWD-2 enter range of one another at 154. If PWD-2 assumes the role of coordinator station at 156, control passes to 158 where PWD-2 transmits periodic beacon signals as the coordinating station. PWD-1 receives the beacon signal at 160 and sends an authorization request to the coordinator station at 162. At 164, PWD-1 is authorized. PWD-1 then sends an association request to the coordinator station at 166. At 170, PWD-1 becomes associated after which PWD-1 broadcasts an announcement message at 172. At 176, all the PWDs in range reply with announcement broadcast messages of their own so that each of the PWDs are announced to one another. Communication functions are then enabled between compatible PWDs within range 178.

If, however, PWD-2 does not assume the role of coordinator at 156 (by virtue of any suitable process), then PWD-1 assumes the coordinator station role and transmits the periodic beacon signals at 180. PWD-2 then receives the beacon signal at 184 and sends an authorization request to the coordinator station at 186. The coordinator station receives the authorization request from PWD-2 at 188, and at 190, PWD-2 is authorized. At 192, PWD-2 sends an association request to the coordinator station, and PWD-2 becomes associated at 196 with the network. PWD-2 then broadcasts an announcement message at 198 and control passes to 176 for the reply messages from other PWDs in range, and communication functions are again enabled at 178.

Once each of the PWDs has identified itself through an announcement broadcast, each of the PWDs in the network can build a list of all users in the network using process 200 of FIG. 11. When announcement message is received from a nearby user at 204, the identifier of the PWD is added to a list of nearby users maintained at each PWD at 208. Such announcement messages can be from the initial entry of a PWD into the network or from an announcement transmitted in response to a broadcast announcement from another PWD. Additionally, it may be advantageous to periodically rebroadcast an announcement message as a refresh message to assure other PWDs within range that a particular PWD has not left the reception area and thereby keep each PWD's list of users current.

Process 210 of FIG. 12 depicts a process for removal of users from the list of nearby users. If any message including a refresh message or broadcast announcement message or any message is sent to a nearby user at 214 and no response is received from the nearby user at 216, a number of retries may be attempted. If the maximum number of retries has not been reached at 218, a retry is attempted at 220. Once a specified maximum number (e.g., 10) of retransmission attempts are completed at 218 without a response, the user is dropped from the list of nearby users at 222 until and unless a new announcement is received from that dropped user. Thus, the failure of a PWD to respond to a message directed to that user or failure to respond to a broadcast announcement or refresh message will result in the PWD being removed from the list of associated nearby users maintained at each PWD. Such failure to respond may result in removal from nearby user lists of all PWDs or only the PWD from which an attempted communication originated.

When a user of one PWD wishes to obtain information from the shared public folder of another PWD, process 230 of FIG. 13 can be utilized in certain embodiments. In this embodiment, when a query is received at 234' the query is matched to a file or folder in the shared public data at 238. The data can then be sent to the source of the query at 244 (either with or without the consent of the owner of the data) depending upon the embodiment or user selection. When the data is received at the source of the query at 246, an alert can be generated (such as, for example, a vibration or audible alert or flashing display or the like) at 248. Subsequent to this alert (if used), the requested data is displayed on the recipient PWD's display at 250.

Process 260 may be used, for example, to send a file from one PWD to another as depicted in FIG. 14. If it is desired to send a file at 264, a list of nearby users is retrieved at 268, and a recipient is selected at 272. A list of files present in the shared public data memory is then retrieved at 276 in the present embodiment. In other embodiments, private files could also be shared by active selection of the owner of the files. At 280, the file is selected, and it is retrieved at 284 and sent to the selected recipient at 288. In other embodiments, the granting of requests for the shared information can be tied to the file or folder itself by specifying either share always, share never, or share with approval. In this case, files or folders with a "share with approval" attribute will call for permission to be granted from the file or folder's owner in order to permit access to the folder.

In addition to the functions described previously, numerous other functions are possible once the initial contact is made between two or more PWDs within a network. For example, an instant messaging type of function can readily be implemented among the associated users in a network. Other functions will also occur to those skilled in the art upon consideration of the present teaching.

Thus, a wireless communication method consistent with certain embodiments involves, at a first portable wireless device (PWD), receiving a beacon indicating that the first PWD has entered a wireless network's communication range; the first PWD responding to the beacon with a request for authorization on wireless network; receiving authorization for the first PWD to communicate using the wireless network; sending a request for the first PWD to be associated with the wireless network; the first PWD receiving confirmation of association with the wireless network; the first PWD broadcasting a first announcement over the wireless network, the announcement comprising at least an identifier that notifies other PWDs associated with the wireless network of the identity of the first PWD; receiving at least one reply announcement broadcast from a second PWD associated with the wireless network that identifies the second PWD; and at the first PWD providing a first shared public folder with contents that can be accessed by the second PWD.

In certain embodiments, at the second PWD providing a second shared public folder has contents that can be accessed by the first PWD. The first and/or the second shared public folders may be Read Only folders. The beacon can transmitted by either a network access point or a PWD acting as a coordinator station. The first announcement can also incorporate a listing of the contents of the first shared public folder. The first announcement can also incorporate at least a portion of the contents of the first shared public folder. The granting of requests for the shared information can be tied to the file or folder itself by specifying either share always, share never, or share with approval. A computer readable storage medium can be used to store instructions which, when executed on a programmed processor, carry out the above processes.

In FIG. 15, which is made up of FIGS. 15-a THROUGH 15-i, represents a plurality of display screen illustrations for a sample embodiment of CloudNet in order to give the reader a sense of the navigation process in accord with certain embodiments consistent with the present invention. FIG. 15-*a* depicts a listing of the users within range of the current PWD. This screen image 300 depicts a user "Mary99" as being highlighted for selection of further information about Mary99 as indicated by the box 304. Once selected, a list of actions that can be carried out by the current PWD in connection with the user identified as Mary99 at FIG. 15-*b*. Screen illustration 308 of FIG. 15-*b* indicates that viewing the public folder (containing the shared public documents) is highlighted at 312. When this selection is made, one can view a list of folders within the public shared folder of Mary99's PWD at screen image 316 of FIG. 15-*c*. From here, the user can navigate to various other screens including the folders listed in FIG. 15-*c*'s screen illustration 316. FIG. 15-*d*, for example, depicts a screen illustration 320 of the folder bio. Screen illustration 324 of FIG. 15-*e* displays a picture of the user 328. Screen illustration 334 of FIG. 15-*f* depicts a folder containing downloadable content including audio and video content. In this screen, it is possible that digital rights management may be required for download of certain of the content. In this case, upon request of the content, a DRM process is instituted prior to the actual download of the content. During this DRM process, the recipient of the download will be required to expend funds in order to acquire digital rights to the downloaded content. Other content may require no such DRM and will simply be downloaded in accordance with process 230 of FIG. 13.

With further regard to DRM, one PWD (a first PWD) may include one physical or virtual public shared directory that has contents that the user is willing to share with other users without the others needing to get permission. Contents of this directory might include a personal web page, Audio and/or video content, books, articles, etc. However, some of this content may be protected by DRM. Another PWD (the second PWD) device within the wireless range may view or download part or all the contents from this public shared directory (subject to any "copy-never" of "copy-no-more") DRM restrictions on the content, to learn more about the interests of the user of the first PWD or simply out of curiosity. If the content is protected by encryption for DRM, the second PWD may be unable to view the content. In this case, according to one embodiment, the second PWD may automatically contact a central DRM-purchasing authority via the Internet or cellular telephone network and informs the user of the cost of purchasing the rights to view the content. The second PWD may be configured to automatically purchase content if under a certain dollar amount. The central authority could then bill or debit the user's stored credit or debit card information (upon receiving password/pin), or an online DRM credit account maintained by the DRM-purchasing authority, for example.

Note that the DRM-purchasing authority serves not only the needs of large Movie studios, Music studios, etc, but can also provide DRM-sales support to private individuals who wish to optionally license their digital content, e.g. photographs, essays, books, etc. The DRM-purchasing authority would typically keep a small percentage of the DRM charge for itself, while crediting the accounts of digital rights content providers based on dollar value sales of their content.

Optionally, the DRM purchasing authority may keep track of which users are entitled to view which content. In this case, if the content was already purchased by the user (and perhaps the user has forgotten, or deleted the original content, or is viewing the content on a new machine) the user may be allowed to view the contents without making a new purchase, however only one copy anywhere may be made viewable at any time, assuming a maximum number of total views of the prior purchased content have not been exceeded. Of course, this is but one exemplary scenario, and many others will occur to those skilled in the art upon consideration of the present teachings.

Note that according to the above-described embodiments, the PWDs provide the user with information regarding the "Local area" contents in a way that allows the user to differentiate local area contents from other network contents (e.g. internet contents also being viewed but via a wireless connection to a hotspot). Thus, the users of PWDs within a small geographic area are able to make contact with others situated close by.

Other folders may similarly be displayed such as that depicted in screen illustration 338 of FIG. 15-*g*. Screen illustration 350 of FIG. 15-*i* depicts the retrieval and listing of nearby users at block 268 of process 260 for transmittal of a file. Once a recipient is selected from screen 350, a list of files is depicted in screen illustration 354 in accordance with block 276 of process 260 in FIG. 15-*i*. It should be noted that the screen images depicted in FIG. 15, as well as those depicted in FIG. 6, are to be considered as examples since the arrangement of data in a display can take many forms, and the present invention is not to be restricted to any one presentation of such information. It should also be noted that the above embodiment has been described from the perspective of PWD devices, however the sharing can occur for non-mobile devices as well. For example, desktop PCs or personal video recorders PVRs located in the same building/campus may similarly communicate with one another and with PWD devices entering their range of wireless communication.

Figure 16:
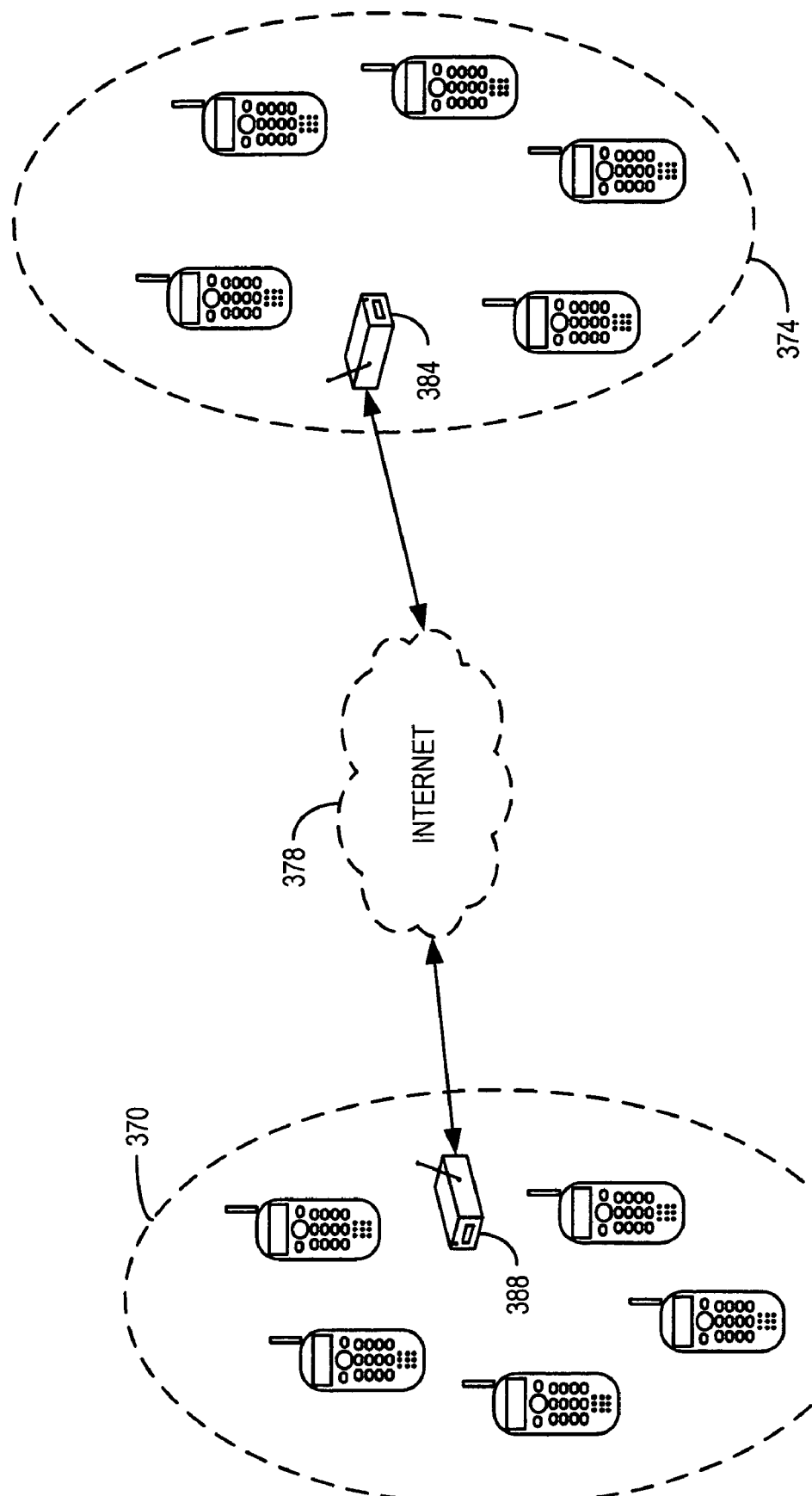
FIG. 16 depicts a variation consistent with certain embodiments in which multiple CloudNet networks are coupled via the Internet to create a virtual CloudNet.

FIG. 16 depicts another variation consistent with certain embodiments of the present invention. In this variation, multiple CloudNet networks, (two in this example shown as 370 and 374) are coupled via the Internet 378 to create a virtual CloudNet. In this example, Access Points 384 and 388 are used to allow the two CloudNet's 370 and 374 to act as a super-CloudNet or "Virtual CloudNet" via the wired infrastructure network of the Internet 378. Consider, for example, if two distinct CloudNets 370 and 374 have formed by groups in two locations separated by hundreds of miles, but if the groups have met for similar reasons, then the groups can be considered to be a single virtual CloudNet. Each CloudNet can form as before, but the CloudNets can use one or more Access Points (already introduced in the document) at each of the two locations, and the Access Points are connected to each other over the wired Internet. The Access Points relay messages between the two CloudNets. Therefore all users (at both locations) appear to each other to be in a single CloudNet, even though all users and PWDs are not physically close to each other.

Figure 17:
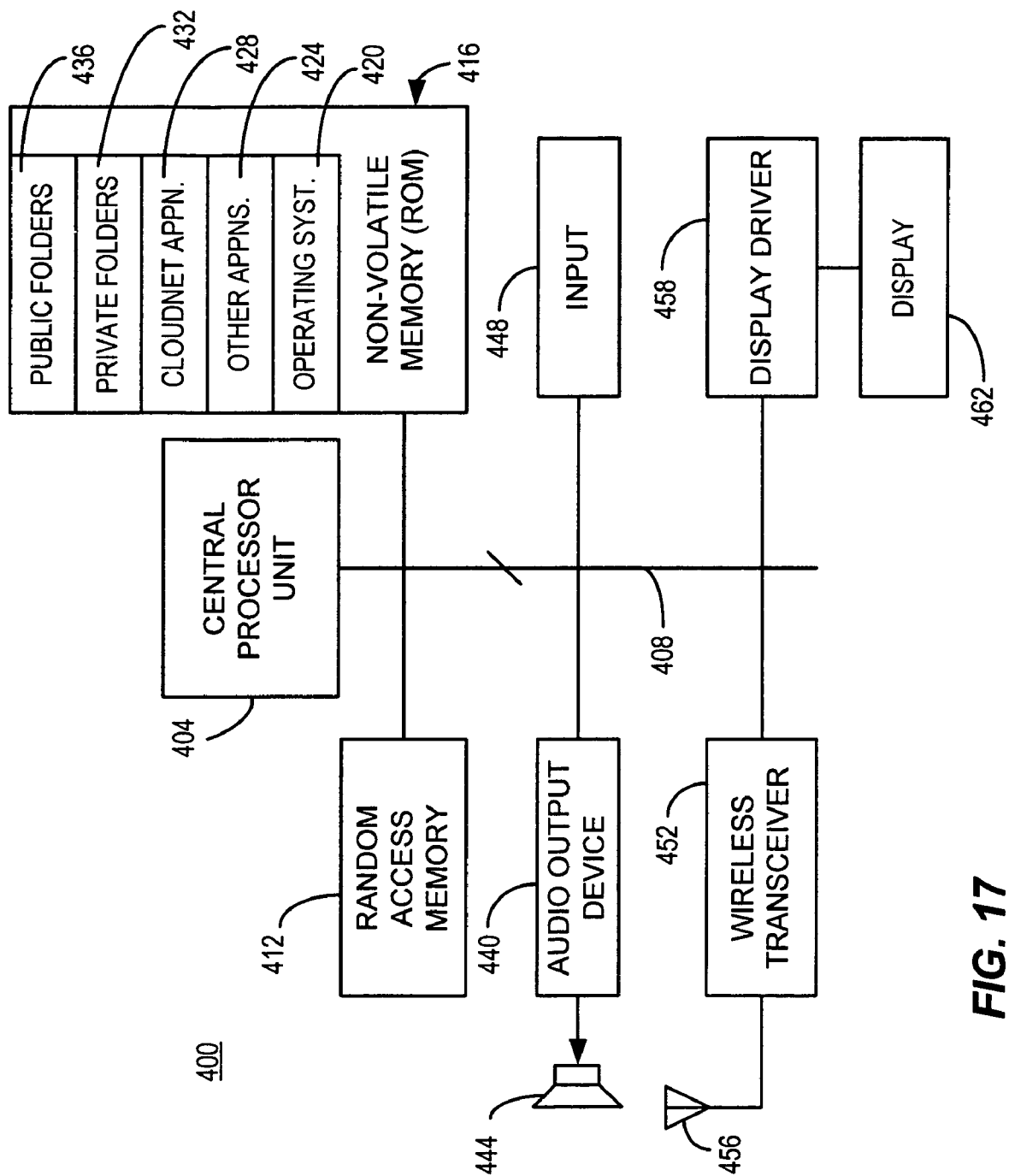
FIG. 17 is a block diagram of a portable wireless device consistent with certain embodiments of the present invention.

The processes previously described can be carried out on any suitable PWD including, but not limited to, wireless telephones, personal digital assistants, portable game consoles, personal organizers, etc. One non-limiting example embodiment of such a PWD is depicted as system 400 depicted in FIG. 17. PWD 400 has a central processor unit (CPU) 404 with an associated bus used to connect the central processor unit 404 to Random Access Memory (RAM) 412 and Non-Volatile Memory 416 in an suitable manner. Non-Volatile memory (e.g., electrically erasable read only memory—EEROM) or disc technology may be used for storage memory 416. Storage 416 is used for mass storage purposes and may contain, among other things, one or more operating systems 420, one or more higher level applications 424 such as the CloudNet application 428 as well as data that may be stored in private folders 432 and public folders 436.

An audio output mechanism, such as audio output circuit 440, may be provided to drive a transducer 444 in order to provide the user with audible alerts and reproduction of voice messages (as in the case of a cellular telephone embodiment). Similarly, a user interface incorporating input devices 448 such as a microphone, keypad, cursor navigator, touch screen and/or touch pad may be provided for the input of information by the PWD's user. PWD 400 also incorporates a wireless transceiver 452 coupled to an antenna 456 or other suitable transducer for facilitation of wireless communication. Display driver 458 is also coupled to bus 408 in order to provide signals to drive a display such as display 462. The display 462 (which may be a touch panel display and also serve as an input device) together with input 448 and audio output devices 440 and 444 provide the user interface for the PWD 400. The wireless transceiver 452 incorporates one or more transmitters and receivers, and may operate over a single frequency or using a single mode or operate over multiple frequencies or frequency ranges using multiple transmission and reception modes. Similarly, transceiver 452 incorporates suitable modulators and demodulators, encoders and decoders, etc. as required to support the two way communications described herein.

Thus, a portable wireless device (PWD) consistent with certain embodiments has a wireless transceiver including a transmitter device and a receiver device. A programmed processor is coupled to the transmitter device and the receiver device to processes signals received by the receiver device and send signals to the transmitter device for transmission. A shared public folder contains files that are to be shared with other PWDs. The receiver device receives a beacon signal indicating that the PWD has entered a wireless network's communication range. The transmitter device responds to the beacon signal with a request for authorization on the wireless network. The receiver device receives authorization for the PWD to communicate using the wireless network. The transmitter device further sends a request for the PWD to be associated with the wireless network. The receiver device further receives confirmation of PWD's association with the wireless network. The transmitter device further broadcasts an announcement over the wireless network, the announcement having at least an identifier that notifies other PWDs associated with the wireless network of the identity of the PWD. The receiver device further receives at least one reply announcement broadcast from another PWD associated with the wireless network that identifies the other PWD. The contents of the shared public folder are provided for access by the other PWD.

In certain embodiments, the shared public folder is a Read Only folder. The announcement may further include a listing of the contents of the shared public folder. The announcement may also further include at least a portion of the contents of the shared public folder. The shared public folder can have an attribute designating that content of the folder is to be shared on the basis of either share always, share never, or share with approval. The shared public folder can contain a file that has an attribute designating that content of the file is to be shared on the basis of either share always, share never, or share with approval.

In another embodiment, a portable wireless device (PWD) has a wireless transceiver including a transmitter and a receiver. A programmed processor is coupled to the transmitter and the receiver, and processes signals received by the receiver and sends signals to the transmitter for transmission. A program running on the programmed processor implements a protocol for accessing a wireless network with communication range of the PWD, wherein the protocol is implemented using communication provided by the transceiver. A shared public folder contains files that are to be shared with another PWD. The contents of the shared public folder are provided for access by the other PWD.

In certain embodiments, the receiver receives a beacon signal indicating that the PWD has entered a wireless network's communication range, and the transmitter responds to the beacon signal with a request for authorization on the wireless network as a part of said protocol. The transmitter can send a request for the PWD to be associated with the wireless network, and the receiver can receive confirmation of PWD's association with the wireless network.

In certain embodiments, the transmitter broadcasts an announcement over the wireless network, the announcement having at least an identifier that notifies other PWDs associated with the wireless network of the identity of the PWD, and the receiver receives one or more reply announcement broadcast from other PWDs associated with the wireless network that identifies the other PWDs. The announcement may further contain a listing of the contents of the shared public folder. The shared public folder may be designated as a Read Only folder. The announcement can further include at least a portion of the contents of the shared public folder. The shared public folder can have an attribute designating that content of the folder is to be shared on the basis of either share always, share never, or share with approval. Similarly the shared public folder can contain one or more files that have an attribute designating that content of the file is to be shared on the basis of either share always, share never, or share with approval. One or more shared files in the shared public folder may require acquisition of digital rights. Numerous other variations will occur to those skilled in the art.

The range of communication for embodiments consistent with the present invention is highly variable and depends upon terrain, wireless technology, antenna gain, antenna height and other considerations. However, generally speaking, the desired range is a range compatible with use of embodiments in large rooms or halls, or common outdoor events (e.g., concerts, sporting events, fairs, festivals, etc.) to capture at least the nearby users, as well as smaller events (e.g., book signings, sports bars, night clubs, airport lounges, etc.). However, this should be considered only as general guidance, since a few meters or tens of meters to several hundreds of meters or even much more may represent a viable range that can be utilized in connection with certain embodiments.

Those skilled in the art will recognize, upon consideration of the above teachings, that certain of the above exemplary embodiments are based upon use of a programmed processor such as CPU 404. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Those skilled in the art will also appreciate, upon consideration of the above teachings, that the program operations and processes and associated data used to implement certain of the embodiments described above can be implemented using disc storage as well as other forms of storage such as for example Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies without departing from certain embodiments of the present invention. Such alternative storage devices should be considered equivalents.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain embodiments herein were described in conjunction with specific circuitry that carries out the functions described, other embodiments are contemplated in which the circuit functions are carried out using equivalent software or firmware embodiments executed on one or more programmed processors. General purpose computers, microprocessor based computers, micro-controllers, optical computers, analog computers, dedicated processors, application specific circuits and/or dedicated hard wired logic and analog circuitry may be used to construct alternative equivalent embodiments. Other embodiments could be implemented using hardware component equivalents such as special purpose hardware and/or dedicated processors.

While certain illustrative embodiments have been described, it is evident that many alternatives, modifications, permutations and variations will become apparent to those skilled in the art in light of the foregoing description.

What is claimed is:

1. A wireless communication method, comprising:
a first portable wireless device (PWD) capable of emitting a periodic beacon indicating an ad hoc wireless network is present and capable of acting as a coordinator station for the ad hoc wireless network;
at the first portable wireless device, receiving a beacon from another PWD acting as a coordinator station for the ad hoc network, indicating that the first PWD has entered the other PWD's established ad hoc wireless network's communication range;
the first PWD responding to the beacon with a request for authorization on the wireless network;
receiving authorization for the first PWD to communicate using the wireless network;
sending a request for the first PWD to be associated with the wireless network;
the first PWD receiving confirmation of association with the wireless network;
the first PWD broadcasting a first announcement over the wireless network, the announcement comprising at least an identifier that notifies other PWDs associated with the wireless network of the identity of the first PWD;
receiving at least one reply announcement broadcast from a second PWD associated with the wireless network that identifies the second PWD;
building a list in the first PWD of all PWDs in range of the periodic beacon of the coordinator station and updating this list each time an announcement message is received from any PWD within range, wherein the PWD entering the ad hoc network is provided sufficient information to assume the role of the coordinator station when necessary; and
at the first PWD providing a first shared public folder with contents that can be accessed by the second PWD and all other PWDs in range.

2. The method according to claim 1, further comprising at the second PWD providing a second shared public folder with contents that can be accessed by the first PWD.

3. The method according to claim 2, wherein the second shared public folder has an attribute designating that content of the folder is to be shared on the basis of either share always, share never, or share with approval.

4. The method according to claim 2, wherein the first shared public folder contains a file that has an attribute designating that content of the file is to be shared on the basis of either share always, share never, or share with approval.

5. The method according to claim 2, wherein the first and second shared public folders comprise Read Only folders.

6. The method according to claim 1, wherein the first shared public folder comprises a Read Only folder.

7. The method according to claim 1, wherein the beacon is transmitted by either a network access point or a PWD acting as a coordinator station.

8. The method according to claim 1, wherein the first announcement further comprises a listing of the contents of the first shared public folder.

9. The method according to claim 1, wherein the first announcement further comprises at least a portion of the contents of the first shared public folder.

10. The method according to claim 1, wherein the first shared public folder has an attribute designating that content of the folder is to be shared on the basis of either share always, share never, or share with approval.

11. The method according to claim 1, wherein the first shared public folder contains a file that has an attribute designating that content of the file is to be shared on the basis of either share always, share never, or share with approval.

12. The method according to claim 1, wherein the shared public folder contains a file that requires acquisition of digital rights before the file is shared.

13. The computer readable storage medium storing instructions which, when executed on a programmed processor, carry out a process according to claim 1.

14. A portable wireless device (PWD), comprising:
a wireless transceiver comprising a transmitter means and a receiver means forming a part of the PWD;
a programmed processor coupled to the transmitter means and the receiver means, that processes signals received by the receiver means and sends signals to the transmitter means for transmission;
the transmitter means capable of transmitting a periodic beacon indicating an established ad hoc wireless network is present and operating as a coordinator station for the ad hoc network;
a shared public folder containing files that are to be shred with other PWDs;
the receiver means for receiving a beacon signal indicating that the PWD has entered a wireless network's communication range wherein another PWD is transmitting a separate periodic beacon and acting as a coordinator station for the ad hoc wireless network;

the transmitter means for responding to the beacon signal with a request for authorization on the wireless network;

the transmitter means further sending a request for the PWD to be associated with the wireless network;

the receiver means further receiving confirmation of PWD's association with the wireless network;

the transmitter means further broadcasting an announcement over the wireless network, the announcement comprising at least an identifier that notifies other PWDs associated with the wireless network of the identity of the PWD;

the receiver means further receiving at least one reply announcement broadcast from another PWD associated with the wireless network that identifies the other PWD;

the receiver means building a list in the PWD of all PWDs in range of the periodic beacon of the coordinator station and updating this list each time an announcement message is received from any PWD within range, wherein the PWD entering the ad hoc network is provided sufficient information to assume the role of the coordinator station when necessary; and means for providing contents of the shared public folder or access by the other PWD.

15. The PWD according to claim 14, wherein the shared public folder comprises a Read Only folder.

16. The PWD according to claim 14, wherein the announcement further comprises a listing of the contents of the shared public folder.

17. The PWD according to claim 14, wherein the announcement further comprises at least a portion of the contents of the shared public folder.

18. The PWD according to claim 14, wherein the shared public folder has an attribute designating that content of the folder is to be shared on the basis of either share always, share never, or share with approval.

19. The PWD according to claim 14, wherein the shared public folder contains a file that has an attribute designating that content of the file is to be shared on the basis of either share always, share never, or share with approval.

20. A portable wireless device (PWD), comprising:

a wireless transceiver comprising a transmitter and a receiver forming a part of the PWD;

a receiver means operative to detect a periodic beacon indicating an established ad hoc wireless network is present, said ad hoc wireless network being coordinated by a second PWD;

a programmed processor coupled to the transmitter and the receiver, that processes signals received by the receiver and sends signals to the transmitter for transmission;

program means running on the programmed processor for implementing a protocol for accessing a wireless network with communication range of the PWD, and that the PWD is acting as an active station connected to the ad hoc wireless network, wherein said protocol is implemented using communication provided by the transceiver;

a shred public folder containing files that are to be shared with another PWD containing a list of all PWDs in range of the periodic beacon of the coordinating PWD and updating this list each time an announcement message is received from any PWD within range, wherein a PWD entering the ad hoc network is provided sufficient information to assume the role of the coordinating PWD when necessary; and means for providing contents of the shared public folder for access by all other PWDs in range.

21. The PWD of claim 20, wherein the receiver receives a beacon signal indicating that the PWD has entered a wireless network's communication range, and wherein the transmitter responds to the beacon signal with a request for authorization on the wireless network as a part of said protocol.

22. The PWD of claim 20, wherein the transmitter sends a request for the PWD to be associated with the wireless network, and the receiver receives confirmation of PWD's association with the wireless network.

23. The PWD of claim 20, wherein the transmitter broadcasts an announcement over the wireless network, the announcement comprising at least an identifier that notifies other PWDs associated with the wireless network of the identity of the PWD, and the receiver receives at least one reply announcement broadcast from another PWD associated with the wireless network that identifies the other PWD.

24. The PWD according to claim 23, wherein the announcement further comprises a listing of the contents of the shared public folder.

25. The PWD according to claim 20, wherein the shared public folder comprises a Read Only folder.

26. The PWD according to claim 20, wherein the announcement further comprises at least a portion of the contents of the shared public folder.

27. The PWD according to claim 20, wherein the shared folder has an attribute designating that content of the folder is to be shared on the basis of either share always, share never, or share with approval.

28. The PWD according to claim 20, wherein the shared public folder contains a file that has an attribute designating that content of the file is to be shared on the basis of either share always, share never, or share with approval.

29. The PWD according to claim 20, wherein the shared public folder contains a file that requires acquisition of digital rights before the file is shared.

* * * * *

UNITED STATES PATENT AND TRADEMARK OFFICE
CERTIFICATE OF CORRECTION

PATENT NO. : 7,619,999 B2
APPLICATION NO. : 11/242105
DATED : November 17, 2009
INVENTOR(S) : DaCosta Page 1 of 1

It is certified that error appears in the above-identified patent and that said Letters Patent is hereby corrected as shown below:

In column 18, line 6, delete "shred" and insert -- shared -- therefor.

Signed and Sealed this

Nineteenth Day of January, 2010

David J. Kappos
*Director of the United States Patent and Trademark Office*

UNITED STATES PATENT AND TRADEMARK OFFICE
CERTIFICATE OF CORRECTION

PATENT NO. : 7,619,999 B2
APPLICATION NO. : 11/242105
DATED : November 17, 2009
INVENTOR(S) : Behram DaCosta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 679 days.

Signed and Sealed this

Twenty-sixth Day of October, 2010

David J. Kappos
*Director of the United States Patent and Trademark Office*